United States Patent
Hellander et al.

(10) Patent No.: US 8,903,396 B2
(45) Date of Patent: Dec. 2, 2014

(54) METHODS AND DEVICES FOR INTER FREQUENCY MEASUREMENTS

(75) Inventors: Bo Hellander, Taby (SE); Niilo Musikka, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/263,867

(22) PCT Filed: Oct. 5, 2011

(86) PCT No.: PCT/SE2011/051189
§ 371 (c)(1), (2), (4) Date: May 16, 2012

(87) PCT Pub. No.: WO2012/047168
PCT Pub. Date: Apr. 12, 2012

(65) Prior Publication Data
US 2012/0231782 A1    Sep. 13, 2012

Related U.S. Application Data

(60) Provisional application No. 61/391,164, filed on Oct. 8, 2010.

(51) Int. Cl.
| | |
|---|---|
| H04W 36/00 | (2009.01) |
| H04W 4/00 | (2009.01) |
| H04L 1/00 | (2006.01) |
| H04L 12/26 | (2006.01) |
| H04W 24/10 | (2009.01) |
| H04W 88/02 | (2009.01) |
| H04W 72/00 | (2009.01) |
| H04W 48/16 | (2009.01) |

(52) U.S. Cl.
CPC .............. *H04W 24/10* (2013.01); *H04W 88/02* (2013.01); *H04W 72/00* (2013.01); *H04W 48/16* (2013.01)

USPC .......................... 455/436; 370/252; 370/332

(58) Field of Classification Search
CPC ..... H04W 24/10; H04W 48/16; H04W 72/10; H04W 88/02
USPC .............. 455/424, 422.1, 436; 370/252, 328, 370/216, 332
See application file for complete search history.

(56) References Cited

U.S. PATENT DOCUMENTS

| | | | |
|---|---|---|---|
| 2008/0132225 A1* | 6/2008 | Ranta et al. | 455/424 |
| 2011/0151876 A1* | 6/2011 | Ishii et al. | 455/437 |
| 2011/0170483 A1* | 7/2011 | Ishii | 370/328 |

FOREIGN PATENT DOCUMENTS

| | | | |
|---|---|---|---|
| WO | WO 2009116643 A1 * | 9/2009 | |
| WO | WO 2009157311 A1 * | 12/2009 | |

OTHER PUBLICATIONS

International Search Report and Written Opinion mailed Feb. 17, 2012 in corresponding Application No. PCT/SE2011/051189.

(Continued)

*Primary Examiner* — Opiribo Georgewill
(74) *Attorney, Agent, or Firm* — Nixon & Vanderhye P.C.

(57) ABSTRACT

A User Equipment (UE) and a mobile communications network node perform or handle inter frequency measurements. The technology prevents overloading the UE with frequency measurement processing by allowing different requirements for measurements, i.e., measurement performance requirements on different frequencies, i.e., cells. When ordering the UE to perform inter frequency measurements, two or more separate neighbor cell lists may be used. This allows a UE having a certain processor capacity to perform measurement control for more cells and frequencies, i.e., measurements on more than two non-used frequencies, without increasing the processing load of the UE.

19 Claims, 9 Drawing Sheets

(56) References Cited

OTHER PUBLICATIONS

Nokia: "Hierarchical cell structures supporting cell reselection", 3GPP Draft Ran WG2, (R2-000066), Jan. 25, 2000, XP050114545.
"3$^{rd}$ Generation Partnership Project; Technical Specification Group Radio Access Network; Radio Resource Control (RRC); Protocol specification (Release 9)", 3GPP Standard; 3GPP TS 25.331 V9.4.0; Oct. 6, 2010, pp. 1-1789, XP050461791.
"LS on CSG Measurements" 3GPP Draft; (R4-101381), May 20, 2010, XP050426510.
Motorola: "Measurement Gap Control for E-UTRAN to GERAN Handover", 3GPP Draft; GR-070006, Sep. 25, 2007, XP050440884.
Ericsson: "FDD Inter-frequency Measurement Requirements (R4-081412)", 3GPP Draft; 3GPP RAN WG4, Jun. 10, 2008, pp. 1-5, XP050179986.
NTT Docomo, Inc.: "Inter-frequency Pico cell measurements for Hetnet deployments (R2-115745)", 3GPP RAN WG2 Meeting 76), Nov. 8, 2011, pp. 1-4; URL: http://www.3gpp.org/ftp/tsg_ran/WG2_RL2/TSGR2_76/Docs/R2-115745.zip.
3GPP TS 25.302 v9.1.0 (Mar. 2010); 3$^{rd}$ Generation Partnership Project; Technical Specification Group Access Network; Services Provided by the Physical Layer (Release 9); pp. 1-90.
3GPP TS 25.133 v9.5.0 (Sep. 2010); 3$^{rd}$ Generation Partnership Project; Technical Specification Group Radio Access Network; Requirements for Support of Radio Resource Management (FDD) (Release 9); pp. 1-250.
3GPP TS 25.215 v9.2.0 (Mar. 2010); 3$^{rd}$ Generation Partnership Project; Technical Specification Group Radio Access Network; Physical Layer; Measurements (FDD) (Release 9); pp. 1-23.
3GPP TS 25.331 v10.0.0 (Jun. 2010); 3$^{rd}$ Generation Partnership Project; Technical Specification Group Radio Access Network; Radio Resource Control (RRC); Protocol Specification (Release 10); pp. 1-944.
Examination Report dated Jul. 7, 2014 (Communication pursuant to Article 94(3) EPC) issued in the European Counterpart Application No. 11799207.3, filed Feb. 7, 2014 (6 pgs).

\* cited by examiner

METHODS AND DEVICES FOR INTER FREQUENCY MEASUREMENTS

This application is the U.S. national phase of International Application No. PCT/SE2011/051189, filed 5 Oct. 2011, which designated the U.S. and claims the benefit of U.S. Provisional Application No. 61/391,164, filed 8 Oct. 2010, the entire contents of each of which are hereby incorporated by reference.

TECHNICAL FIELD

The technical field of the present disclosure relates to different aspects of inter frequency measurements. In more detail, it is provided methods in a User Equipment and in a mobile communications network for performing and handling inter frequency measurements. It is further provided embodiments of a node and a User Equipment for performing said methods.

BACKGROUND

Inter frequency measurement may be used by the UTRAN (Universal Terrestrial Radio Access Network) e.g. for handover decisions. The measurements are defined in 3GPP TS 25.215, the measurement model is defined in 3GPP TS 25.302 and the measurement accuracies are specified in section 3GPP TS 25.133, section 9. Control of measurement reporting is specified in 3 GPP TS 25.331 and parallel measurements are specified in 3GPP TS 25.133 section 8.2. Compressed mode is specified in 3GPP TS 25.215.

Present disclosure relates to carrier frequency measurement in communications systems. In 3GPP TS 25.331 section 8.4.0 is a number of definitions regarding such measurement procedures listed.

Thus, an UTRAN may control a measurement in the User Equipment either by broadcast of system information and/or by transmitting a measurement control message. The following information is used to control the User Equipment measurements and the measurement results reporting:

1. Measurement identity: A reference number that should be used by the UTRAN when setting up, modifying or releasing the measurement and by the UE in the measurement report.
2. Measurement command: One out of three different measurement commands.
    Setup: Setup a new measurement.
    Modify: Modify a previously defined measurement, e.g. to change the reporting criteria.
    Release: Stop a measurement and clear all information in the UE that are related to that measurement.
3. Measurement type: One of the types listed below describing what the UE shall measure.

The different types of measurements are:
Intra-frequency measurements: measurements on downlink physical channels at the same frequency as the active set. A measurement object corresponds to one cell;
Inter-frequency measurements: measurements on downlink physical channels at frequencies that differ from the frequency of the active set and on downlink physical channels in the active set. A measurement object corresponds to one cell;
Inter-RAT measurements: measurements on downlink physical channels belonging to another Radio Access Technology (RAT) than UTRAN, e.g. GSM or E-UTRA. A measurement object corresponds to one cell (e.g. GSM) or one frequency (e.g. E-UTRA);
Traffic volume measurements: measurements on uplink traffic volume. A measurement object corresponds to one cell;
Quality measurements: Measurements of downlink quality parameters, e.g. downlink transport block error rate.
UE-internal measurements: Measurements of UE transmission power and UE received signal level;
UE positioning measurements: Measurements of UE position.

3GPP requires UEs to be capable of performing measurements on up to two non used frequencies, see 3GPP TS 25.133 section 8.1.2.1:
32 inter frequency cells, including
    FDD cells distributed on up to 2 additional FDD carriers.
Today there are requirements for the UE to be able to measure up to two non-used frequencies for each cell.

There are also measurement performance requirements, see 3GPP TS 25.133, for how fast these measurements shall be completed.

This is sufficient when performing measurements for pure coverage purposes. Typical scenarios involve rescuing users moving out of a capacity cluster on to a macro layer. Being able to select between two target macro layers is more than enough.

The operators deploy networks with more and more frequencies and there is an increasing need for measuring and find new frequencies. According to the present standard, an UE must have the capability to measure two non-used frequencies that sets the limit when having microcells with different frequencies for load sharing and at the same time needs the escape possibility and protection to find a new cell with better coverage. An UE having a certain processor capacity may therefore not have enough capacity to perform measurement control for more cells and frequencies, i.e. measurements on more than two non used frequencies, without increasing the processing load of the user equipment. To inter frequency measurement, the standard of 3GPP TS 25.133 provides algorithms for determining the time in a certain radio environment for identifying the best cell for a certain frequency. There are also requirements, e.g. RAN4, set for maximum time for delivering a measurement report.

However, the processor demands and performance requirements are great for an UE to find a new cell and at the same time measure the quality of the frequencies. Said demands and requirements are set in 3GPP TS 25.133, and they are linked to the compressed mode gaps in which the measurements are performed.

SUMMARY

It is therefore one object to provide a solution to the problem of prohibiting overloading the User Equipment's processor with frequency measurement processing, thereby allowing User Equipments having a certain processor capacity to perform measurement control for more cells and frequencies, i.e. measurements on more than two non used frequencies, without increasing the processing load of the User Equipment.

The object is achieved by allowing different requirements for measurements, i.e. measurement performance requirements, on different frequencies, i.e. cells. When ordering the UE to perform inter frequency measurements, at least two separate neighbour cell lists may be used.

According to one aspect, it is provided a method and embodiments of said method in a User Equipment UE for performing inter frequency measurements in a mobile communications network. The UE receives from said mobile communications network at least one measurement control message, and performs inter frequency measurements in accordance with the at least one measurement control message for achieving measurement result. The UE then reports the measurement result back to said mobile communications network. In the at least one control message, the UE receives information identifying a first group of cells and a first set of one or more measurement performance requirements, and a second group of cells and a second set of one or more measurement performance requirements.

According to further one aspect, it is provided a method and embodiments of said method for handling inter frequency measurements in a mobile communications network. The mobile communications network transmits at least one measurement control message to a User Equipment, UE, and it receives from the UE at least one measurement report. The method is configured to define from a set of neighbour cells a first group of cells to be measured according to a first set of one or more measurement performance requirements, and to define a second group of cells to be measured according to a second set of one or more measurement performance requirements.

According to yet another aspect, it is provided a User Equipment and embodiments of the User Equipment comprising a radio communication unit for transmitting and receiving radio traffic in a mobile communications network. Said unit is further configured to perform inter frequency measurements and to receive from the mobile communications network at least one measurement control message. A control unit is configured to control the communication unit and the measurement of inter frequencies. The User Equipment is configured to receive information in the at least one measurement control message, information identifying a first group of cells and a first set of one or more measurement performance requirements, and a second group of cells and a second set of one or more measurement performance requirements for performing the inter frequency measurements.

According to yet another aspect, it is provided a node and embodiments of the node, which are configured to handle inter frequency measurements in a mobile communications network. Said node comprises a measurement control unit being configured to transmit at least one measurement control message to a User Equipment, UE, and to receive from the User Equipment a measurement report comprising the measurement results. The measurement control unit is configured to define from a set of cells a first group of cells to be measured according to a first set of one or more measurement performance requirements, and to define a second group of cells to be measured according to a second set of one or more measurement performance requirements for performing the inter frequency measurement in the User Equipment.

Further embodiments are set out in the dependent claims.

One advantage with the present method is that the accuracy and precision of the measurement is not decreased; only the time for determining and delivering the measurement result is different for different cell groups.

Another advantage is that there is no need for demanding or setting any new requirement regarding processing capability of the user equipment.

BRIEF DESCRIPTION OF THE DRAWINGS

The foregoing, and other, objects, features and advantages of the present disclosure will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present disclosure. In other instances, detailed descriptions of well known methods, devices, and circuits are omitted so as not to obscure the description of the present methods and entities with unnecessary detail.

Figure 1:
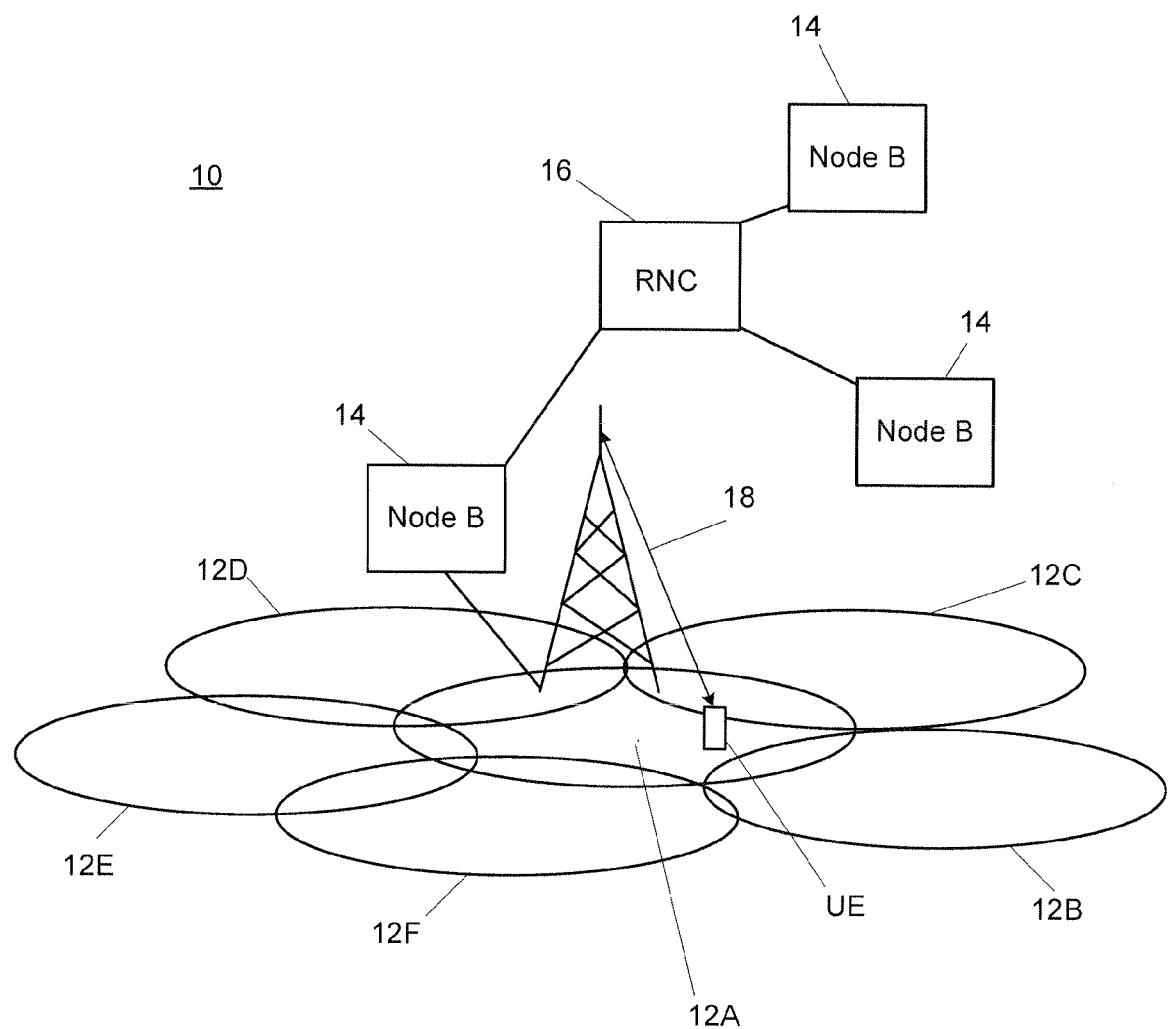
FIG. 1 is a block diagram of an exemplary radio communications network in which entities and methods described herein may be implemented.

FIG. 1 is a block diagram of an exemplary radio communications network 10 in which entities and methods described herein may be implemented. The figure is illustrating a part of a cellular radio telecommunications network and system. A local geographical area is covered by a system of cells 12A-12F, each cell serving User Equipments, UEs, e.g. mobile stations, mobile phones, mobile terminals, mobile devices, mobile computers, mobile handsets etc, for the moment residing in the cell. Different UEs are capable to communicate with each other by means of base stations 14, such as Node B, Base Transceiver Station (BTS). Node B is used in UMTS equivalent to the BTS description used in GSM. It is the hardware that is connected to the mobile phone network that communicates directly with UEs. In contrast with GSM base stations, Node B uses WCDMA/TD-SCDMA as the air interface technology. As in all cellular systems, such as UMTS and GSM, the Node B contains radio frequency transmitter(s) and the receiver(s) used to communicate directly with UEs, which move freely around it. In this type of cellular network, the UEs cannot communicate directly with each other but have to communicate with the Node B. Traditionally, the Node Bs have minimum functionality, and are controlled by an RNC, Radio Network Controller, 16. However, this is changing with the emergence of High Speed Downlink Packet Access (HSDPA), where some logic (e.g. retransmission) is handled on the Node B for lower response times.

In FIG. 1, the UE is residing in cell 12A, which have the neighbour cells 12B-12F. Further, macro diversity is present, which means that UEs are listening to a number of cells with the same frequency at the same time, and the network is listening for UEs in a number of cells at the same time.

Thus, the radio traffic 18, e.g. voice calls, web surfing, data transmission, in the air interface between one user equipment and the Node B is provided via uplinks and downlinks according to Frequency Division Duplex, FDD.

One difference between a Node B and a GSM base station is the frequency use. The utilization of WCDMA technology allows cells belonging to the same or different Node Bs and even controlled by different RNC to overlap and still use the same frequency. In fact, the whole network can be implemented with just one frequency pair. The effect is utilized in soft handovers. The most obvious cause for performing a handover is that due to its movement a user can be served in another cell more efficiently (like less power emission, less interference). It may however also be performed for other reasons such as system load control.

There are following categories of handover (also referred to as handoff):

Hard Handover:
Hard handover means that all the old radio links in the UE are removed before the new radio links are established. Hard handover can be seamless or non-seamless. Seamless hard handover means that the handover is not perceptible to the user. In practice a handover that requires a change of the carrier frequency (i.e. inter-frequency handover) is always performed as hard handover.

Soft Handover
Soft handover means that the radio links are added and removed in a way that the UE always keeps at least one radio link to the UTRAN. Soft handover is performed by means of macro diversity, which refers to the condition that several radio links are active at the same time. Normally soft handover can be used when cells operated on the same frequency are changed.

Softer Handover:
Softer handover is a special case of soft handover where the radio links that are added and removed belong to the same Node B (i.e. the site of from which several sector-cells are served). In softer handover, macro diversity with maximum ratio combining can be performed in the Node B, whereas generally in soft handover on the downlink, macro diversity with selection combining is applied.

For preparing for the handover, measurements of the quality of different frequencies are necessary.

UTRAN may control a measurement in the UE either by broadcast of system information and/or by transmitting a measurement control message.

The following information is used to control the UE measurements and the measurement results reporting:
1. Measurement identity: A reference number that should be used by the UTRAN when setting up, modifying or releasing the measurement and by the UE in the measurement report.
2. Measurement command: One out of three different measurement commands.
    Setup: Setup a new measurement.
    Modify: Modify a previously defined measurement, e.g. to change the reporting criteria.
    Release: Stop a measurement and clear all information in the UE that are related to that measurement.
3. Measurement type: One of the types listed below describing what the UE shall measure.

Presence or absence of the following control information depends on the measurement type:
4. Measurement objects: The objects on which the UE shall measure measurement quantities, and corresponding object information.
5. Measurement quantity: The quantity the UE shall measure on the measurement object. This also includes the filtering of the measurements.
6. Reporting quantities: The quantities the UE shall include in the report in addition to the quantities that are mandatory to report for the specific event.
7. Measurement reporting criteria: The triggering of the measurement report, e.g. periodical or event-triggered reporting.
8. Measurement Validity: Defines in which UE states the measurement is valid.
9. Measurement reporting mode: This specifies whether the UE shall transmit the measurement report using AM or UM RLC.
10. Additional measurement identities: A list of references to other measurements. When this measurement triggers a measurement report, the UE shall also include the reporting quantities for the measurements referenced by the additional measurement identities.

The UE shall support a number of measurements running in parallel. The UE shall also support that each measurement is controlled and reported independently of every other measurement.

Cells that the UE is monitoring are grouped or defined into three mutually different sets:
1. Cells belonging to the active set. User information is sent from all these cells. Active Set is defined as the set of cells the UE is simultaneously connected to (i.e., the UTRA cells currently assigning a downlink DPCH to the UE constitute the active set). In FDD, the cells in the active set are involved in soft handover. In TDD the active set always comprises one cell only. The UE shall only consider active set cells included in the variable CELL_INFO_LIST for measurement; i.e. active set cells not included in the CELL_INFO_LIST shall not be considered in any event evaluation and measurement reporting.
2. Cells, which are not included in the active set, but are included in the CELL_INFO_LIST, belong to the monitored set.
3. Cells, detected by the UE that are neither in the CELL_INFO_LIST nor in the active set, belong to the detected set. Reporting of measurements of the detected set is only applicable to intra-frequency measurements made by UEs in CELL_DCH state.

If the IE "Cells for measurement" has been included in a measurement control message, only monitored set cells explicitly indicated for a given intra-frequency (resp. inter-frequency, interRAT) measurement by the IE "Cells for measurement" shall be considered for measurement. If the IE "Cells for measurement" has not been included in a measurement control message, all of the intra-frequency (resp. inter-frequency, inter RAT) cells stored in the variable CELL_INFO_LIST shall be considered for measurement. The IE "Cells for measurement" is not applicable to active set cells e.g. when the triggering condition refers to active set cells, the UE shall consider all active set cells in the CELL_INFO_LIST for measurement irrespective if these cells are explicitly indicated by the IE "Cells for measurement". CELL_INFO_LIST is herein also denoted as neighbour list.

Figure 2:
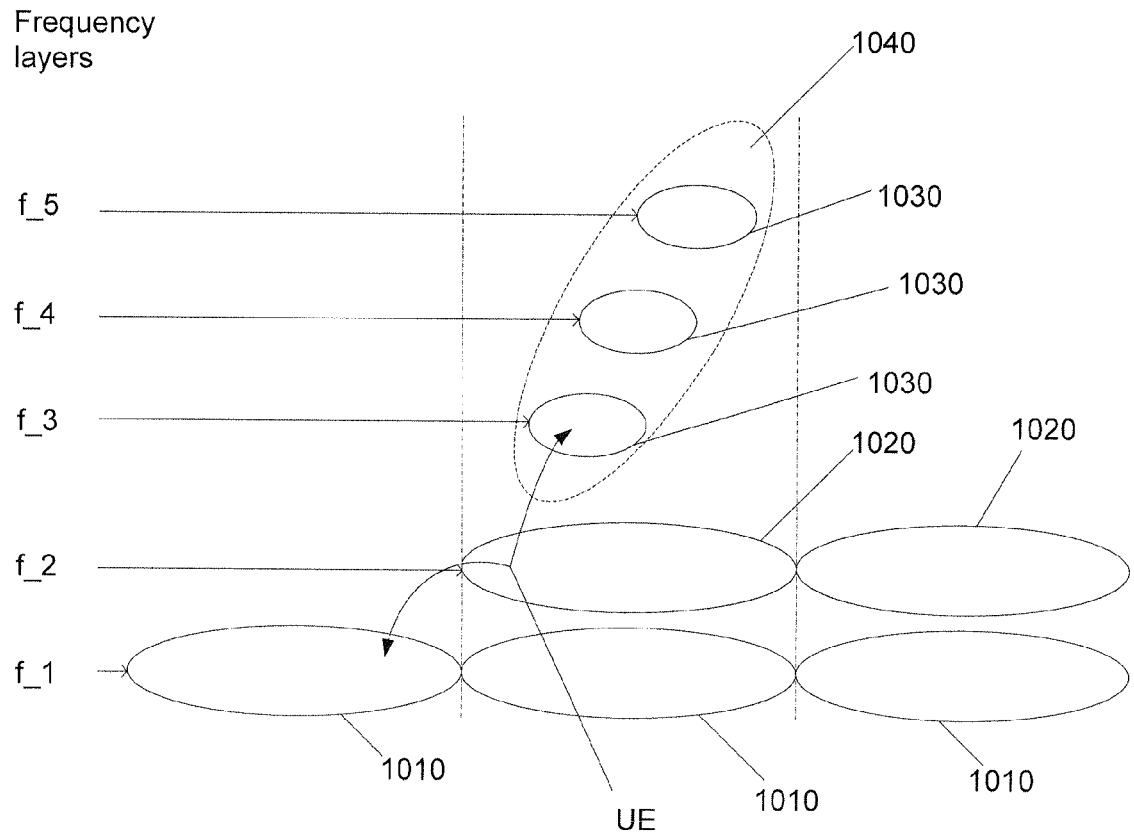
FIG. 2 is a diagram schematically illustrating different frequency layers of a cell topology in cellular radio communications networks and systems.

FIG. 2 is a diagram schematically illustrating different frequency layers of a cell topology in heterogeneous communications networks and systems. When considering heterogeneous networks consisting of a mixture of topologies such as nationwide macro cells 1010, limited clusters of macro cells 1020 for providing capacity expansion and micro cells 1030, also for providing capacity expansion, it is possible to end up in in a situation where different simultaneous needs to perform measurements on inter frequency neighbour cells are present—both on the nationwide macro layer for coverage purposes but also on micro cells for traffic off loading purposes.

The nationwide macro cells 1010 are in frequency layer f_1, limited clusters of macro cells 1020 are in frequency layer f_2, and micro cells 1030 in different frequency layers f_3, f_4 and f_5. An UE residing in frequency layer f_2 may therefore perform different inter frequency measurements.

It is one object to provide a solution to the problem of prohibiting overloading the User Equipment's processor with frequency measurement processing, thereby allowing User Equipments having a certain processor capacity to perform measurement control for more cells and frequencies, i.e. measurements on more than two non used frequencies, without increasing the processing load of the User Equipment.

The object is achieved by allowing different requirements for measurements, i.e. measurement performance requirements on different frequencies, i.e. cells. When ordering the UE to perform inter frequency measurements, at least two separate neighbour cell lists may be used. One list of neighbour cells on which measurements shall be performed with the current measurement performance requirements, e.g. neighbours measured on for coverage purposes, and a second list of cells on which measurements shall be made with much looser measurement performance requirements, e.g. neighbour cells measured on for load sharing purposes.

The nationwide macro cells 1010 in frequency layer f_1 may be regarded as a first group of cells that are measured according to a first set of one or more measurement performance requirements, and the micro cells 1030 in the frequency layers f_3, f_4 and f_5 may be regarded as a second group 1040 of cells that are measured according to a second set of one or more measurement performance requirements. These different measurement purposes, e.g. coverage and load sharing, have different requirements on measurement performance. Handover for coverage purposes need to be quick in order to avoid dropping calls when moving out of coverage. Handover for load sharing purposes doesn't have the same urgency. Herein is provided methods and devices for facilitating inter frequency measurement and measurement control in heterogeneous communications networks and systems.

FIG. 2 also illustrates that nationwide cells, i.e. carriers, provide extra capacity also within a limited area.

The radio network controller, RNC, generates and transmits a measurement order, i.e. a measurement control message, to the UEs. According to the disclosure, the RNC may therefore be adapted to define which cells which have to be promptly measured, and for which cells measurements may be less urgent. The measurement control message comprises a neighbour list of cells. Different alternatives are provided:
1. The first group and second group of cells are identified in separate neighbour cell lists;
2. The first group and second group are identified in a common neighbour list in which one of the groups are identified with a flag;
3. The groups of cells are identified in different measurement control messages;
4. The groups of cells are identified in one measurement control message.

Or, more generally, when handling more than two groups of cells:
1. The groups of cells are identified in separate neighbour cell lists;
2. The group are identified in a common neighbour list in which one of the groups are identified with a flag;
3. The groups of cells are identified in different measurement control messages;
4. The groups of cells are identified in one measurement control message.

In the following, the description of the exemplified embodiments has been limited to embodiments defining two groups of cells only for simplifying the description. However, there is no problem for a skilled person to understand how to expand the described examples to involve more groups of cells than two.

Herein, event triggered measurements are discussed, but such measurements may also be periodical.

In the event triggered case, the RNC encloses in the message a set of rules for when to trig the event, e.g. threshold values, time to trigger, hysteresis, etc, and the list of cells to measure. Different ways are suggested, e.g.:

The same set of rules for all cells, but different measurement performance requirements regarding when or how quickly different cells should be measured; or Sending different measurement control messages, e.g. one message regarding cells with low measurement performance requirements and a first set of rules, and one separate message comprising a list of cells with high measurement performance requirements and a second set of rules defining when the event criteria are fulfilled.

Thus, the UE:s get help to give high priority to some cells and low priority to another group of cells. This could be useful for different cases: for finding the best cell when the coverage becomes bad or for finding the best cell for load sharing. Said two cases have different measurement performance requirements: high demands for finding a new cell, or the session will be lost, but in the case of load sharing, the demands are less critical regarding measurement performance, i.e. time to deliver measurement data of the frequencies.

As an example, a set of one or more measurement performance requirements for a first and a second group of cells respectively are differentiated by the time allowed to complete the measurement/measurements. A set of measurement performance requirements may comprise one or more different requirements, but one of the measurement performance requirements defines the time for a UE to perform the measurement of the cell/cells.

The measurement performance requirements for the first and second groups of cells respectively are differentiated by the time allowed completing the measurement, e.g. measurement performance requirements for the first group of cells defines a shorter time for identifying said cell than for the cells of the second group according to the measurement performance requirements for said second group. With "time allowed completing the measurement" is meant the time within which an UE shall be able to identify a new detectable cell belonging to the monitored set.

Thus, one group of cells are measured with higher demands, i.e. quick measurement and report deliverance, and another group with less demands, i.e. longer time period, regarding time to measure and deliver a report. Less time demands for the measurement cause less demand of a UE's processor capacity to measure the frequencies than higher demands. Higher demands, i.e. performance requirements, correspond to fewer time units, shorter time period, than less performance requirements.

Note that a group of cells may contain one cell or more than one cell, i.e. one or more cells.

Figure 3:
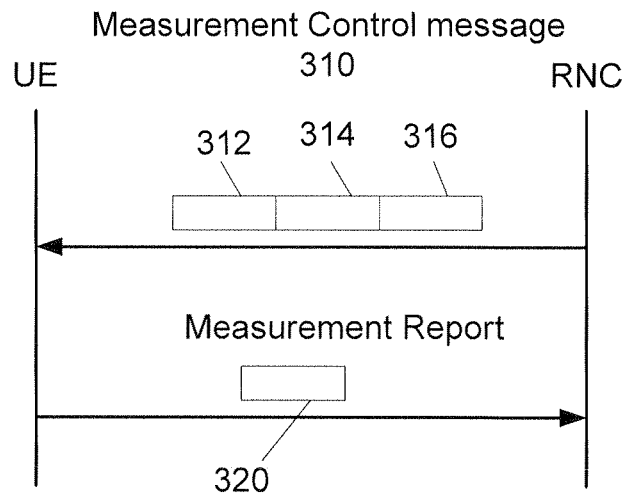
FIG. 3 is a signalling scheme illustrating the exchange of measurement control messages according to further one embodiment between a node entity and a User Equipment.

FIG. 3 is a signalling scheme illustrating the exchange of measurement control messages according to further one embodiment between a node entity and a User Equipment. As illustrated in FIG. 3, the measurement control message 310 is a measurement order to an UE from a node entity, preferably a Radio Network Controller, RNC, in the network. The measurement control message 310 may comprise one or more sets of event criteria 312 for trigging generation and transmission of measurement reports, one or more sets of measurement performance requirements 314 and one or more neighbour node lists 316 comprising one or more groups of cells to be measured. The event criteria 312 may be threshold values, time to trigger value, hysteresis, etc. When an event criterion is fulfilled, the UE is adapted to send a measurement report 320 comprising measurement data about frequencies in the listed cells back to the node entity.

Figure 4:
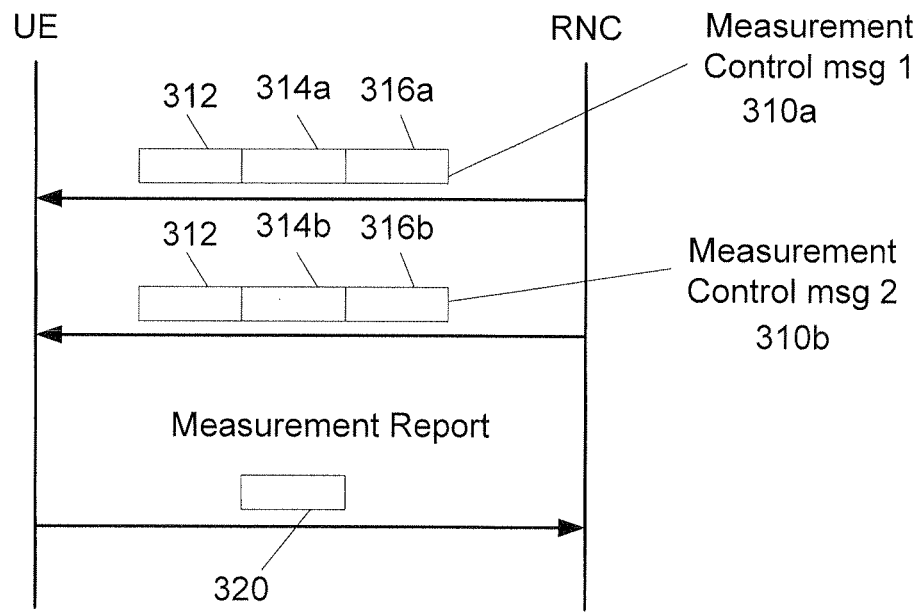
FIG. 4 is a signalling scheme illustrating the exchange of measurement control messages according to further one embodiment between a node entity and a User Equipment.

FIG. 4 is a signalling scheme illustrating the exchange of measurement control messages according to further one embodiment between a node entity and a User Equipment. Two separate measurement control messages (msg 1, msg 2) 310a, 310b comprising sets of event criteria 312 for trigging a measurement report, sets of measurement performance requirement 314 and neighbour node list 316 are generated and transmitted from the node entity RNC. Measurement control message 310a comprises a list 316a with one group of cells to be measured. Inter frequency measurements for said group of cells 316a are performed according to a first set of one or more measurement performance requirements 314a. Measurement control message 310b comprises a list 316b with one group of cells to be measured. Inter frequency measurements for said group of cells 316b are performed according to the second set of one or more measurement performance requirements 316b. When an event criterion is fulfilled, the UE is adapted to send a measurement report 320 comprising measurement data about frequencies in the listed cells, both groups, back to the node entity.

Figure 5:
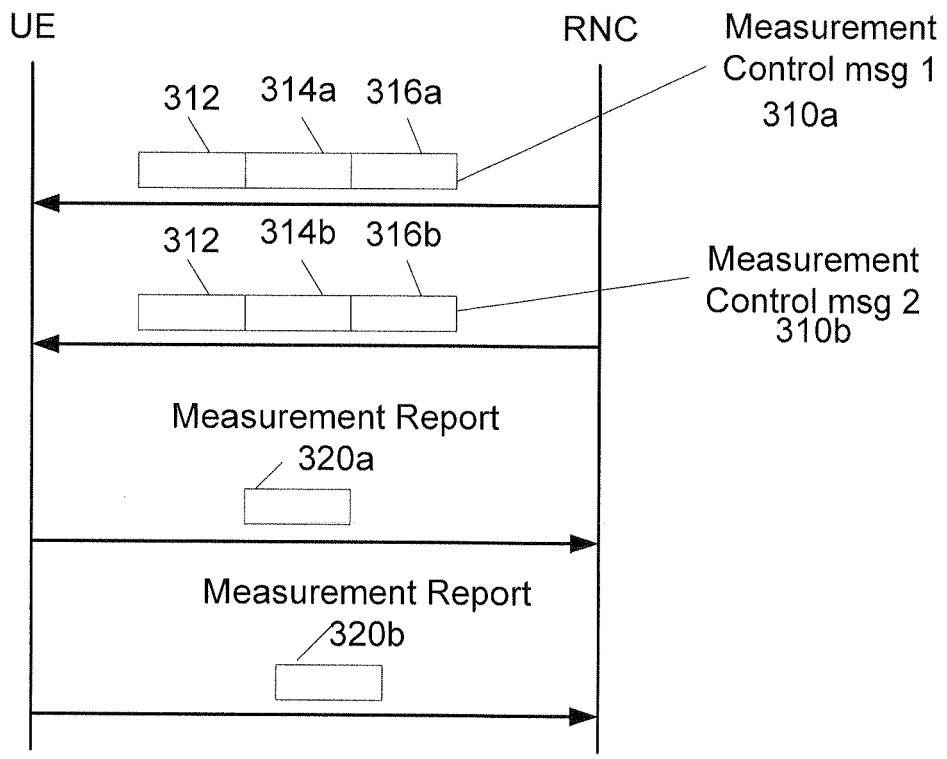
FIG. 5 is a signalling scheme illustrating the exchange of measurement control messages according to another embodiment between a node entity and a User Equipment.

FIG. 5 is a signalling scheme illustrating the exchange of measurement control messages according to another embodiment between a node entity and a User Equipment. Two separate measurement control messages (msg 1, msg 2) 310a, 310b comprising sets of event criteria 312 for trigging a measurement report, sets of measurement performance requirement 314 and neighbour node lists 316 are generated and transmitted from the node entity RNC. Measurement control message 310a comprises a list 316a with one group of cells to be measured. Inter frequency measurements for said group of cells 316a are performed according to a first set of one or more measurement performance requirements 314a. Measurement control message 310b comprises a list 316b with one group of cells to be measured. Inter frequency measurements for said group of cells 316b are performed according to the second set of one or more measurement performance requirements 316b. When an event criterion is fulfilled, the UE is adapted to send a measurement report 320a comprising measurement data about frequencies in the listed cells of the first group 316a back to the node entity. The UE is adapted to send a measurement report 320b comprising measurement data about frequencies in the listed cells of the second group 316b back to the node entity.

Figure 6:
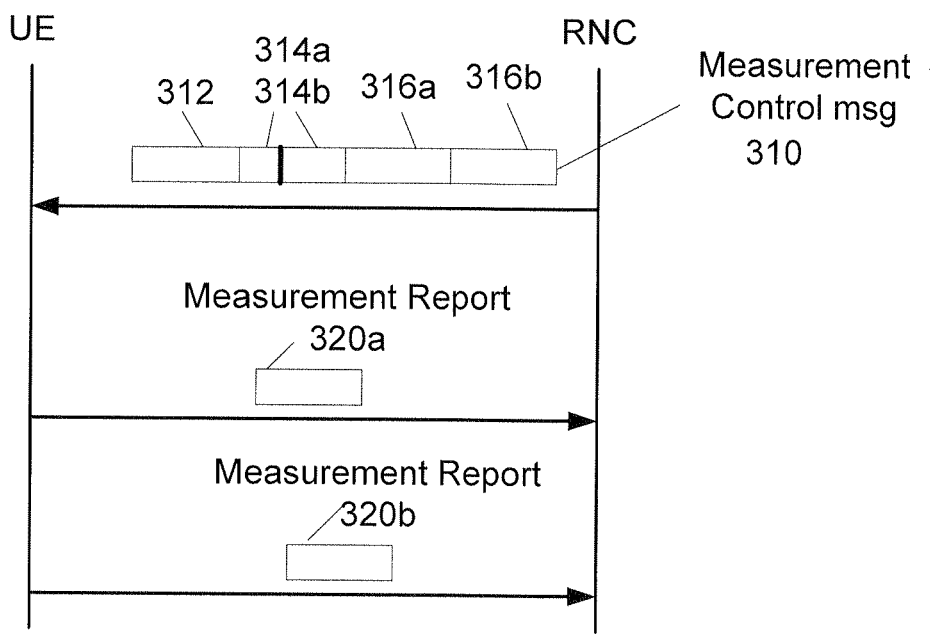
FIG. 6 is a signalling scheme illustrating the exchange of measurement control messages according to yet another embodiment between a node entity and a User Equipment.

FIG. 6 is a signalling scheme illustrating the exchange of measurement control messages according to another embodiment between a node entity and a User Equipment. The measurement control message 310 may comprise one or more sets of event criteria 312 for trigging generation and transmission of measurement reports, a first and a second set of one or more measurement performance requirements 314a, 314b and, first and second neighbour node lists 316a, 316b. When an event criterion is fulfilled, the UE is adapted to send a measurement report 320a comprising measurement data about frequencies in the listed cells of the first group 316a back to the node entity. The UE is adapted to send a measurement report 320b comprising measurement data about frequencies in the listed cells of the second group 316b back to the node entity.

According to one embodiment, the first group and second group of cells may be defined in separate neighbour cell lists 316a, 316b, also denoted CELL_INFO_LISTs, as illustrated in FIGS. 4, 5 and 6.

In yet another embodiment, the first group and second group may be defined in a common neighbour list 316 in which one of the groups are identified with a flag, or other marking, see FIG. 3.

In further one embodiment of the method, the groups of cells may be received in different measurement control messages 310a, 310b, see examples in FIGS. 4 and 5.

In one additional embodiment of the method, the groups of cells may be received in one single measurement control message 310, as illustrated in FIGS. 3 and 6.

Figure 7:
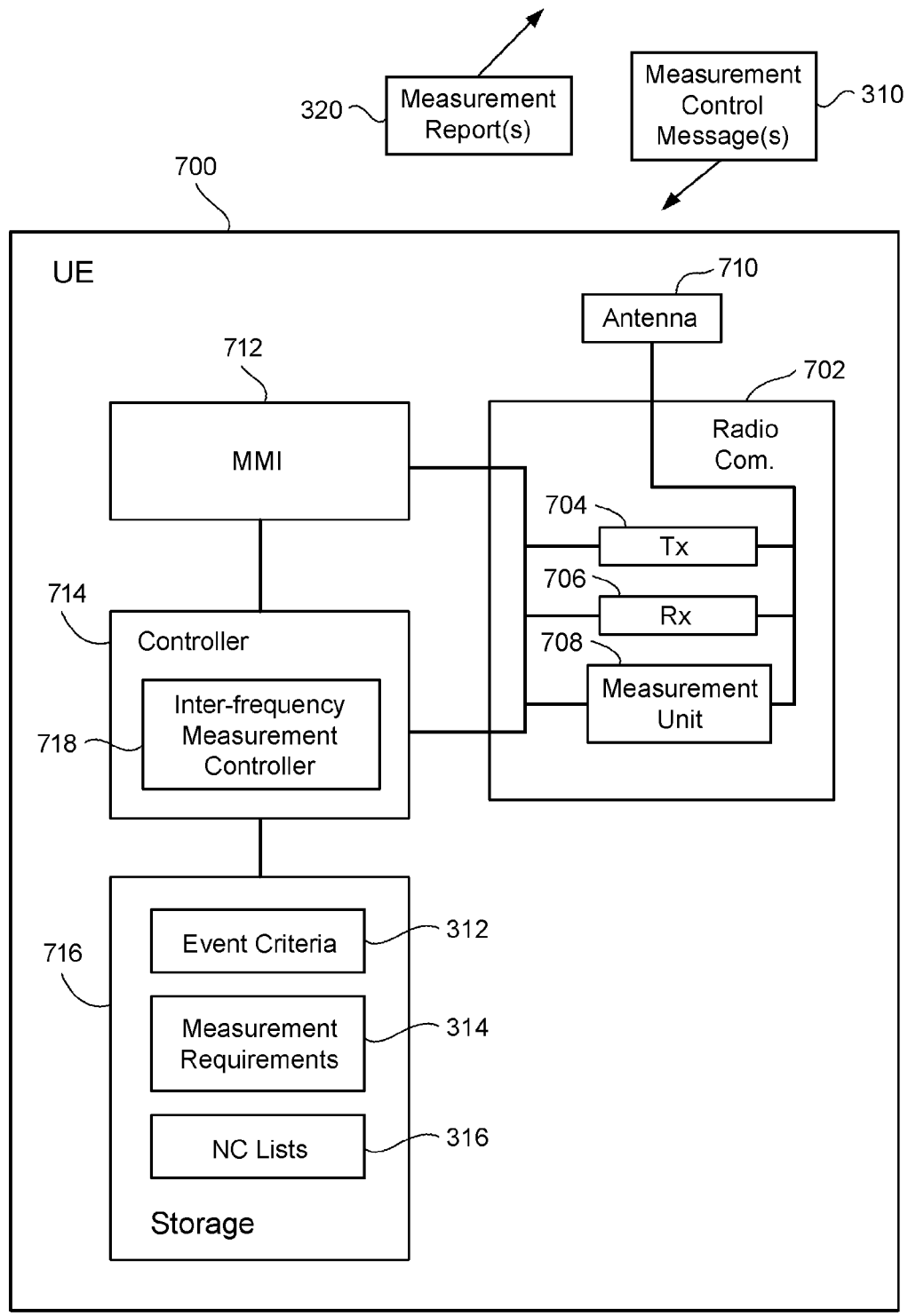
FIG. 7 is a block diagram schematically illustrating an embodiment of a User Equipment.

FIG. 7 is a block diagram schematically illustrating embodiments of a User Equipment, UE, 700. The UE 700 comprises a radio communication unit 702 for transmitting, by means of transmit block 704, and receiving, by means of receiver block 706, radio traffic in a mobile communications network having heterogeneous cell topology. Said unit 702 is further configured to perform inter frequency measurements by means of measurement block 708, and to receive node measurement control messages 310. The UE's transmit block 704 is adapted to send measurement reports 320 comprising measurement data about frequencies in the listed cells back to the mobile radio communications network and a suitable node entity, e.g. comprising the Radio Network Controller, handling the measurement processes, measurement results and handover decisions.

The radio communication unit 702 is connected to an antenna 710, a Man-Machine-Interface (MMI) 712 and a control unit 714. The control unit 714 is configured to control the communication unit 702 and the measurement block 708 for achieving inter frequencies measurement results. Said communication unit 702 is further configured to transmit reports of the measurement result back to the node. The control unit 714 is configured to control the communication unit 702 to perform the inter frequency measurement for different groups of cells according to different sets of measurement performance requirements.

In the present embodiments of the UE 700, the control unit 714 is configured to control the communication unit 702 to perform the inter frequency measurement for a first group of cells according to a first set of one or more measurement performance requirements, and for a second group of cells according to a second set of one or more measurement performance requirements. The control unit 714 is connected to a storage 716, wherein one or more sets of event criteria 312 for trigging generation and transmission of measurement reports, one or more sets of measurement performance requirements 314, e.g. 314a, 314b, . . . , and one or more neighbour node lists 316, e.g. 316a, 316b, . . . , comprising one or more groups of cells to be measured. Said event criteria 312, measurement performance requirements 314, and neighbour node lists 316 may have been received in at least one measurement control message generated and sent from a node, e.g. RNC, in the mobile communications network serving the UE. The event criteria 312 may be threshold values, time to trigger value, hysteresis, etc. When an event criterion is fulfilled, the UE is adapted to send a measurement report 320 comprising measurement data about frequencies in the listed cells back to the node entity.

In more general terms, the User Equipment 700 may be described to comprise:

Means 706 for receiving at least one measurement control message from a mobile communications network, i.e. received from a node of the mobile communications network serving the UE. The means 706 for receiving is adapted to receive information identifying the first group of cells and the second group of cells in the at least one control message. Further, the User Equipment is configured to receive information identifying the first group of cells and the second group of cells in the at least one control message. The measurement performance requirements for the first and second groups of cells respectively are differentiated by the time allowed completing the measurement, e.g. measurement performance requirements for the first group of cells defines a shorter time for identifying said cell than for the cells of the second group according to the measurement performance requirements for said second group;

Means 708 for performing inter frequency measurements in accordance with the at least one measurement control message to produce a measurement result, wherein the means 708 for performing inter frequency measurements is adapted to:

perform the inter frequency measurements for a first group of cells according to one or more first measurement performance requirements; and to perform the inter frequency measurements for a second group of cells according to one or more second measurement performance requirements; and Means, e.g. the control unit 714 configured to generate measurement reports and a transmitter 704 for sending the report, for reporting the measurement result back to the mobile communications network.

In the present embodiments of the UE 700, the control unit 714 is configured to control the communication unit 702 to perform embodiments of a method for inter frequency measurement for a first group of cells according to a first set of one or more measurement performance requirements, and for a second group of cells according to a second set of one or more measurement performance requirements. The control unit 714 may therefore be provided with an inter frequency measurement controlling means 718 for performing and controlling embodiments of a method 800 for inter frequency measurement for a first group of cells according to a first set of one or more measurement performance requirements, and for a second group of cells according to a second set of one or more measurement performance requirements.

The embodiments of the method may be implemented in digital electronically circuitry, or in computer hardware, firmware, software, or in combinations of them. Apparatuses for performing embodiments of the method may be implemented in a computer program product tangibly embodied in a machine readable storage device for execution by a programmable processor; and method steps for controlling and performing the inter frequency measurements may be performed by a programmable processor executing a program of instructions to perform functions of said inter frequency measurements by operating on input data and generating output.

Thus, said inter frequency measurements may advantageously be implemented in one or more computer programs that are executable on a programmable system including at least one programmable processor 714 coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

Said embodiments of a method 800 for inter frequency measurement will now be described in more detail with reference to FIG. 8.

Figure 8:
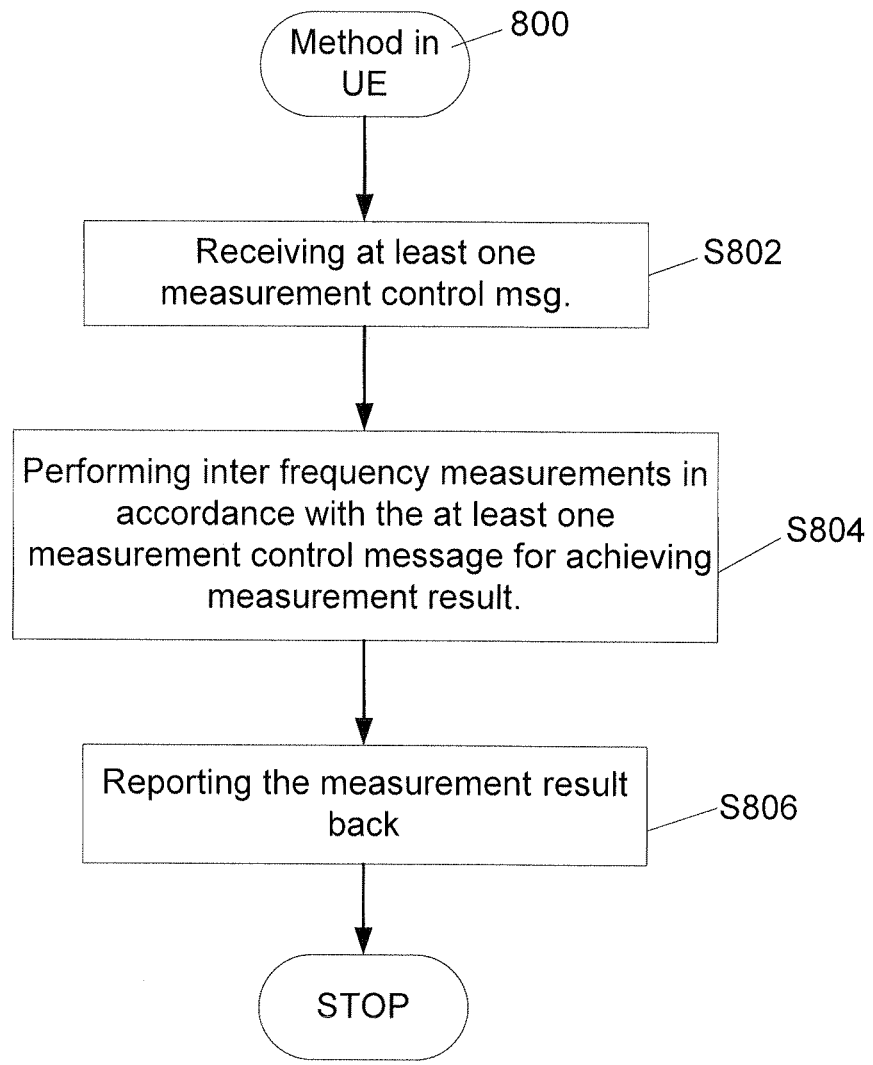
FIG. 8 is a flowchart illustrating a User Equipment adapted embodiment of the method.

FIG. 8 is a flowchart illustrating User Equipment adapted embodiments of a method 800 to perform inter frequency measurements in a mobile communications network having heterogeneous cell topology, wherein said method may comprise following steps:

Step S802: Receiving at least one measurement control message. Said at least one measurement control message is received from the mobile communications network, preferably a node entity of said network. Said step may further involve receiving information identifying a first group of cells and a first set of one or more measurement performance requirements, and a second group of cells and a second set of one or more measurement performance requirements in the at least one control message. Said node may preferably be a Radio Network Controller of a mobile communications network serving the User Equipment. The measurement control messages may further comprise one or more sets of event criteria for trigging generation and transmission of measurement reports, one or more sets of measurement performance requirements and one or more neighbour node lists comprising one or more groups of cells to be measured. According to one embodiment, a first group and a second group of cells may be defined in separate neighbour cell lists, also denoted CELL_INFO_LIST. In yet another embodiment, the first group and second group may be defined in a common neighbour list in which one of the groups are identified with a flag, or other marking. In further one embodiment of the method, the groups of cells may be received in different measurement control messages. In one additional embodiment of the method, the groups of cells may be received in one single measurement control message. Embodiments of control measurement messages and different lists are illustrated in FIGS. 3-6.

Step S804: Performing inter frequency measurements in accordance with the at least one measurement control message for achieving measurement result. The step S804 may further involve: Performing the inter frequency measurements for different received groups of cells according to corresponding selected set of measurement performance requirements. In another embodiment, said step, i.e. step S804, is configured as follows:

Performing the inter frequency measurements for a first group of cells according to a first set of one or more measurement performance requirements, and for a second group of cells according to a second set of one or more measurement performance requirements. An example of different groups of cells and different set of measurement performance requirements are illustrated in FIG. 2.

Step S806: Reporting the measurement result back. The measurement result is reported back to said mobile communications network. When an event criterion is fulfilled, the UE is adapted to send a measurement report 320 comprising measurement data about frequencies in the listed cells back to the node entity. Thus, the UE is equipped with means for reporting the measurement result back to the mobile communications network. The control unit 714 may be configured to generate the report, which is transmitted to the mobile communications network by the transmitter 704.

Figure 9:
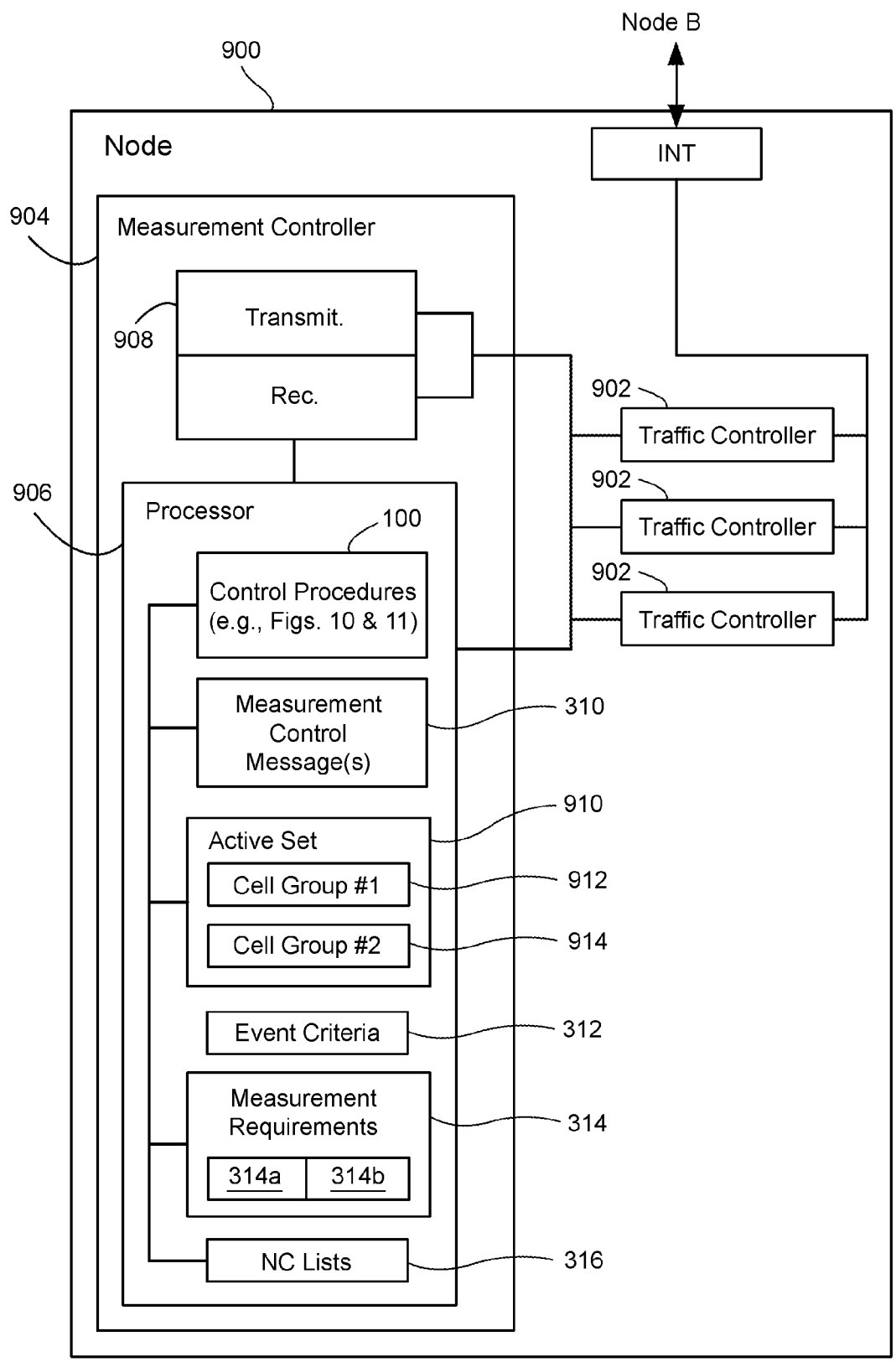
FIG. 9 is a block diagram schematically illustrating an embodiment of a network node entity.

FIG. 9 is a block diagram schematically illustrating embodiments of a network node entity. Thus, according to further one aspect, a node entity 900 is provided. Said node entity is configured to perform/control inter frequency measurements in a mobile communications network having heterogeneous cell topology, see FIGS. 1 and 2. Said node entity 900 comprises radio traffic controlling units 902 configured to control the radio traffic in a number of cells in said network between the mobile communications network and User Equipments supported by said mobile communications network. The entity 900 may further comprise a measurement control unit 904 comprising a processor 906 being configured to define a set of neighbour cells to an active set 910, and a transmitter and receiver control block 908 to transmit measurement control messages to User Equipments, UE:s, and to receive from the UE measurement reports comprising the measurement result. The measurement control unit 904 is configured to define different groups of cells 912, 914 of said cell set 910 to be measured according to different measurement performance requirements 314a, 314b. Said processor 906 is configured to execute and control methods for handling inter frequency measurements in a mobile communications network, such as the method embodiments 100' and 100", see further FIGS. 10 and 11.

According to one embodiment, the measurement control unit 904 is configured to define a first group 912 of cells of a cell set, said first groups of cells to be measured according to a first set of one or more measurement performance requirements 314a, and to define a second group of cells 914 to be measured according to a second set of one or more measurement performance requirements 314b.

The measurement control unit 904 is further configured to handle one or more sets of event criteria 312 for triggering generation and transmission of measurement reports, one or more sets of measurement performance requirements 314 (involving requirements 314a, 314b) and one or more neighbour node lists 316 comprising one or more groups of cells (912, 914, ...) to be measured. The event criteria 312 may be threshold values, time to trigger value, hysteresis, etc.

In the present embodiments of the node entity 900, the processor 904 is configured to control the measurement control unit 906 to perform embodiments of a method 100 for handling inter frequency measurements in a mobile communications network. The processor 904 may therefore be provided with an inter frequency measurement control unit 906 for performing embodiments of a method 100 for handling inter frequency measurements in a mobile communications network.

The embodiments of the method 100 may be implemented in digital electronically circuitry, or in computer hardware, firmware, software, or in combinations of them. Apparatuses for performing embodiments of the method may be implemented in a computer program product tangibly embodied in a machine readable storage device for execution by a programmable processor; and method steps may be performed by a programmable processor executing a program of instructions to perform functions of said inter frequency measurements by operating on input data and generating output.

Thus, said method for handling inter frequency measurements may advantageously be implemented in one or more computer programs that are executable on a programmable system including at least one programmable processor 906 coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (Application Specific Integrated Circuits).

Said embodiments of a method 100 for handling inter frequency measurements will now be described in more detail with reference to FIG. 10.

Figure 10:
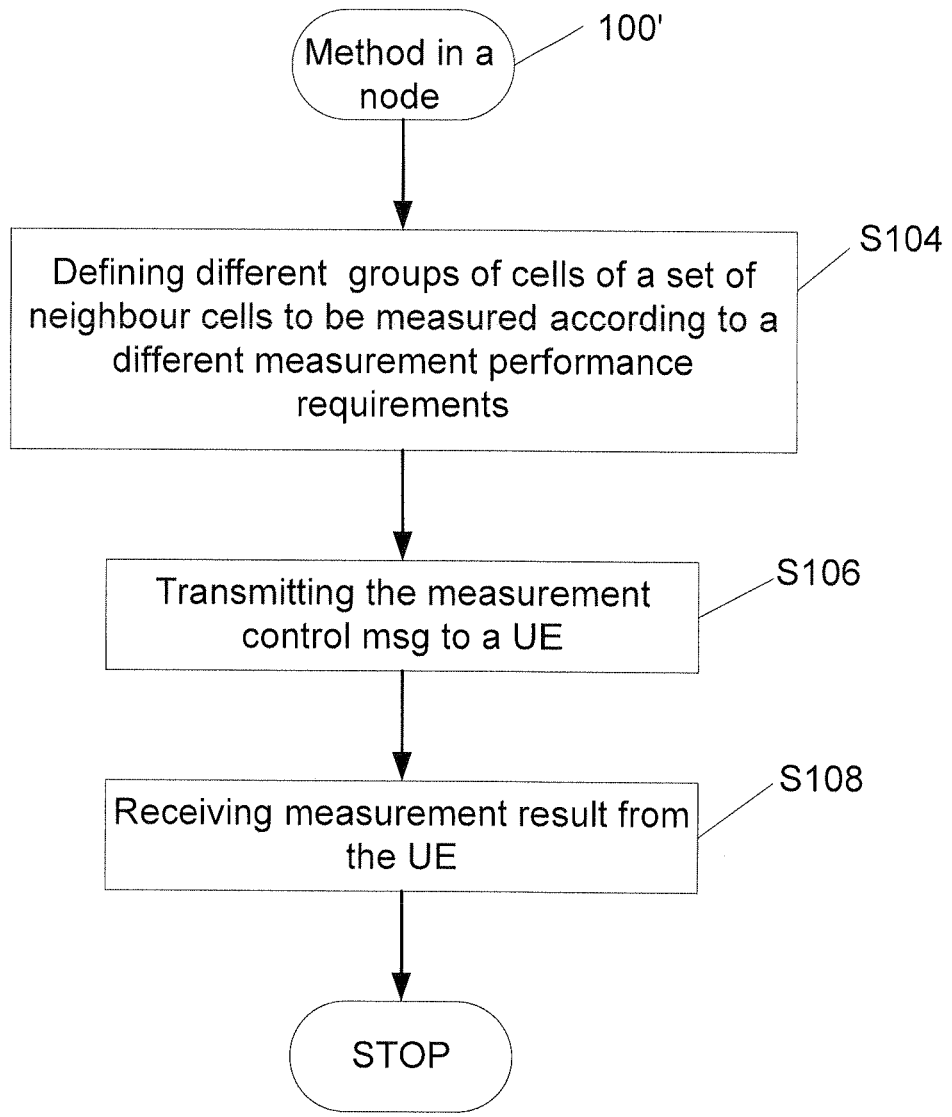
FIG. 10 is a flowchart illustrating a node equipment adapted embodiment of the present method.
Figure 11:
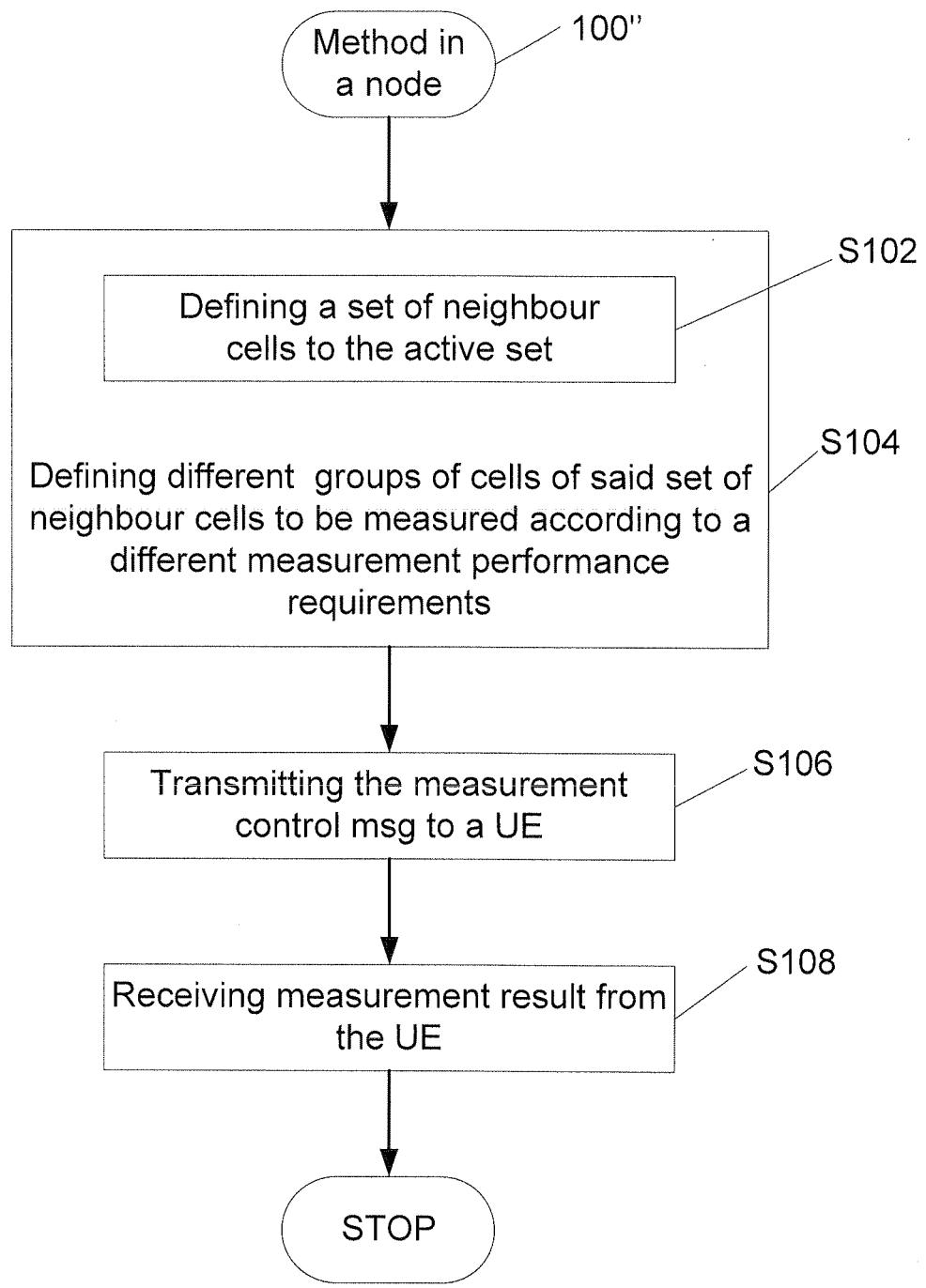
FIG. 11 is a flowchart illustrating another node equipment adapted embodiment of the present method.

FIG. 10 is a flowchart illustrating node equipment adapted embodiments of a method 100 for handling, i.e. controlling, managing and ordering, inter frequency measurements. The method 100 may be performed in a node, e.g. RNC, of a mobile radio communications network and the method is configured to handle by managing inter frequency measurements in a mobile communications network having heterogeneous cell topology. Said node, which may control radio traffic of a number of cells in said network between the node and User Equipments, UEs, may be configured to perform following steps according to a first embodiment 100' of a method 100:

Step S102: Defining a set of neighbour cells to an active set. This step is however optional for the present embodiment of the method. An embodiment 100" of the present method 100 is illustrated in FIG. 11, wherein step S102 is a part of step S104. The measurement control unit 904 than comprises a processor 906 being configured to define a set of neighbour cells to an active set 910.

Step S104: Defining different groups of cells of a set of neighbour cells to be measured according to different measurement performance requirements. The different groups of cells are configured as follows:

Defining from said set of neighbour cells a first group 912 of cells of to be measured according to a first set 314a of one or more measurement performance requirements, and a second group 914 of cells to be measured according to a second set 314b of one or more measurement performance requirements. The measurement control unit 904 and its processor 906 is configured to define different groups of cells 912, 914 of said cell set 910 to be measured according to different measurement performance requirements 314a, 314b. According to one embodiment, the first group and second group of cells may be defined in separate neighbour cell lists, also denoted CELL_IN-FO_LISTs. In yet another embodiment, the first group and second group may be defined in a common neighbour list in which one of the groups are identified with a flag, or other marking. In further one embodiment of the method, the groups of cells may be enclosed in different measurement control messages. In one additional embodiment of the method, the groups of cells may be enclosed in one single measurement control message. Embodiments of control measurement messages and different lists are illustrated in FIGS. 3-6.

Step S106: Transmitting measurement control messages to an UE. The measurement control unit 904 and its processor 906 are configured to generate measurement control messages 310. Said measurement control messages are transmitted by the transmitter and receiver control block 908 to UEs supported and serviced by the mobile communication network.

Step S108: Receiving from the UE a measurement report 320 comprising the measurement result. Said measurement results are received by the transmitter and receiver control block 908. The measurement control unit 904 and its processor 906 handles and stores the received measurement results in a storage (not shown). Said radio traffic controlling units 902 configured to control the radio traffic in a number of cells in said network are configured to use said measurement results in different handover situations where handover decisions for User Equipments have to be made.

FIG. 11 is a flowchart illustrating other node equipment adapted embodiments 100" of a method 100 for handling inter frequency measurements. In these embodiments of the method, step S102, is integrated with step S104, as illustrated in the flowchart of FIG. 11. Step S104 involves:

Step S102: Defining a set of neighbour cells to an active set. The measurement control unit 904 than comprises a processor 906 being configured to define a set of neighbour cells to an active set 910.

The other steps of these embodiments are similar to the steps described in the embodiments 100' of the method 100. For achieving the stated objects, embodiments of methods and devices have been provided and described above.

One method and its embodiments are performed in a User Equipment UE for performing inter-frequency measurements in a mobile communications network. The method and its embodiments comprise the receiving from a node in the mobile communications network of at least one measurement control message, and performing inter frequency measurements in accordance with the at least one measurement control message for achieving measurement result and reporting the measurement result back to the node. The step of performing measurements comprise performing the inter frequency measurements for a first group of cells according to a first set of one or more measurement performance requirements, and for a second group of cells according to a second set of one or more measurement performance requirements.

Further, it is provided embodiments of a method in a node for handling inter frequency measurements in a mobile communications network. The method and its embodiments comprise a step of defining from a set of neighbour cells a first group of cells to be measured according to a first set of one or more measurement performance requirements, and to define a second group of cells to be measured according to a second set of one or more measurement performance requirements. The defining step may also comprise defining a set of neighbour cells to an active set. The method and its embodiments may further comprise transmitting at least one measurement control message to a User Equipment UE. Further, the method and its embodiments comprise receiving from the UE at least one measurement report.

In addition, a User Equipment and embodiments thereof are provided for achieving the above described objects.

Said user equipment and its embodiments comprise a radio communication unit for transmitting and receiving radio traffic in a mobile communications network. Said unit is further configured to perform inter frequency measurements and to receive from the mobile communications network, preferably a node, at least one measurement control message. Said user equipment and its embodiments comprise a control unit configured to control the communication unit and the measurement of inter frequencies, wherein the control unit is configured to control the communication unit to perform the inter frequency measurement for a first group of cells according to a first set of one or more measurement performance requirements, and for a second group of cells according to a second set of one or more measurement performance requirements.

According to some embodiments, the measurement control message may be received from a Radio Network Controller in a node of in a mobile communications network.

Further, a node and embodiments thereof are provided for achieving the above described object.

The node and embodiments thereof are configured to handle inter frequency measurements in a mobile communications network. Said node and its embodiments comprise a measurement control unit being configured to define a set of neighbour cells to an active set and to transmit at least one measurement control message to User Equipments and to receive from a UE a measurement report comprising the measurement result. The measurement control unit is configured to define from said set of cells a first group of cells to be measured according to a first set of one or more measurement performance requirements, and a second group of cells to be measured according to a second set of one or more measurement performance requirements.

The description of the exemplified embodiments has been limited to embodiments defining two groups of cells only for simplifying the description. However, there is no problem for a skilled person to understand how to expand the described examples to involve more groups of cells than two.

A number of embodiments of the present disclosure have been described. It will be understood that various modifications may be made without departing from the scope of this technical solution. Therefore, other implementations are within the scope of the following claims.

The invention claimed is:

1. A method in a User Equipment (UE) for performing inter frequency measurements in a mobile communications network, the method comprising:
  receiving from said mobile communications network at least one measurement control message including information in the at least one control message identifying a first group of cells and a first set of one or more measurement performance requirements and a second different group of cells and a second set of one or more measurement performance requirements, the first set of one or more measurement performance requirements being greater than the second set of one or more measurement performance requirements;
  performing inter frequency measurements in accordance with the at least one measurement control message for achieving a measurement result including performing the inter frequency measurements for the first group of cells according to the first set of one or more measurement performance requirements and for the second group of cells according to the second set of one or more measurement performance requirements; and reporting the measurement result back to said mobile communications network, wherein the measurement performance requirements for the first and second groups of cells respectively are differentiated by a time allowed for completing the measurement, and wherein the inter frequency measurements for the first group of cells according to the first set of one or more measurement performance requirements are to be performed in less time than for the second group of cells according to the second set of one or more measurement performance requirements.

2. The method according to claim 1, wherein the first set of one or more measurement performance requirements require more UE processing resources than an amount of UE processing resources needed to meet the second set of one or more measurement performance requirements.

3. The method according to claim 1, wherein the first group and second group of cells are identified in separate neighbour cell lists.

4. The method according to claim 1, wherein the first group and second group are identified in a common neighbour list in which at least one of the groups are identified by one flag or different flags.

5. The method according to claim 1, wherein the groups of cells are identified in different measurement control messages.

6. The method according to claim 1, wherein the groups of cells are identified in one measurement control message.

7. A method for handling inter frequency measurements in a mobile communications network, the method comprising:

defining from a set of neighbour cells a first group of cells to be measured according to a first set of one or more measurement performance requirements, defining a second group of cells to be measured according to a second set of one or more measurement performance requirements, where the first set of one or more measurement performance requirements are more demanding than the second set of one or more measurement performance requirements, transmitting at least one measurement control message to a User Equipment (UE) that includes information identifying the first group of cells and the first set of one or more measurement performance requirements and the second different group of cells and the second set of one or more measurement performance requirements;

receiving from the UE at least one measurement report including the inter frequency measurements for the first group of cells according to the first set of one or more measurement performance requirements and for the second group of cells according to the second set of one or more measurement performance requirements, wherein the measurement performance requirements for the first and second groups of cells respectively are differentiated by a time allowed for completing the measurement, and wherein the inter frequency measurements for the first group of cells according to the first set of one or more measurement performance requirements are to be performed in less time than for the second group of cells according to the second set of one or more measurement performance requirements.

8. The method according to claim 7, wherein the first group and second group of cells are identified in separate neighbour cell lists.

9. The method according to claim 7, wherein the first group and second group are defined in a common neighbour list in which at least one of the groups are identified by one flag or different flags.

10. The method according to claim 7, wherein the groups of cells are identified in different measurement control messages.

11. The method according to claim 7, wherein the groups of cells are transmitted in one measurement control message.

12. A User Equipment comprising:

a radio communication unit configured to transmit and receive radio traffic in a mobile communications network, said radio communication unit being further configured to receive from a node at least one measurement control message including information in the at least one control message identifying a first group of cells and a first set of one or more measurement performance requirements and a second different group of cells and a second set of one or more measurement performance requirements, the first set of one or more measurement performance requirements being greater than the second set of one or more measurement performance requirements, a control circuitry configured to control performance of measurement of one or more inter frequencies including inter frequency measurements for the first group of cells according to the first set of one or more measurement performance requirements and for the second group of cells according to the second set of one or more measurement performance requirements, wherein the User Equipment is configured to report the inter frequency measurements to said node, wherein the measurement performance requirements for the first and second groups of cells respectively are differentiated by a time allowed for completing the measurement, and wherein the inter frequency measurements for the first group of cells according to the first set of one or more measurement performance requirements are to be performed in less time than for the second group of cells according to the second set of one or more measurement performance requirements.

13. The User Equipment according to claim 12, wherein the first set of one or more measurement performance requirements require more UE processing resources than an amount of UE processing resources needed to meet the second set of one or more measurement performance requirements.

14. The User Equipment according to claim 12, wherein the first group and second group of cells are identified in separate neighbour cell lists.

15. The User Equipment according to claim 12, wherein the first group and second group are identified in a common neighbour list in which at least one of the groups are identified by one flag or different flags.

16. The User Equipment according to claim 12, wherein the groups of cells are identified in different measurement control messages.

17. The User Equipment according to claim 12, wherein the groups of cells are identified in one measurement control message.

18. A node for handling inter frequency measurements in a mobile communications network, said node comprising:

an interface, and a measurement control unit including a data processor configured to:

define from a set of cells a first group of cells to be measured according to a first set of one or more measurement performance requirements, define a second group of cells to be measured according to a second set of one or more measurement performance requirements for performing the inter frequency measurement in the UE, where the first set of one or more measurement performance requirements are more demanding than the second set of one or more measurement performance requirements, transmit via the interface at least one measurement control message to a User Equipment (UE), and receive via the interface from the UE a measurement report including a measurement result including the inter frequency measurements for the first group of cells according to the first set of one or more measurement performance requirements and for the second group of cells according to the second set of one or more measurement performance requirements, wherein the measurement performance requirements for the first and second groups of cells respectively are differentiated by a time allowed for completing the measurement, and wherein the inter frequency measurements for the first group of cells according to the first set of one or more measurement performance requirements are to be performed in less time than for the second group of cells according to the second set of one or more measurement performance requirements.

19. A node configured to perform a method according to claim 8.

* * * * *